Oct. 26, 1954

W. A. ANDERSON 2,692,486

ROTARY DRIVE COUPLING

Filed Aug. 19, 1952

INVENTOR.
WALTER A. ANDERSON

BY Jesse A. Holton

ATTORNEY

Patented Oct. 26, 1954

2,692,486

UNITED STATES PATENT OFFICE 2,692,486

ROTARY DRIVE COUPLING

Walter A. Anderson, Trumbull, Conn., assignor to Underwood Corporation, New York, N. Y., a corporation of Delaware Application August 19, 1952, Serial No. 305,260

4 Claims. (Cl. 64—29)

This invention relates to yieldable drive couplings, more particularly to an overload slip coupling for accounting and the like machines.

In many types of business machines, the mechanism may lose its proper adjustment due to wear, or looseness of parts or may be misoperated causing the driven mechanism to stall. Such a stall may overload the machine parts causing damage with consequent expensive repairs and loss of use. It is therefore desirable to provide a drive coupling for such machines which will slip before a dangerous overload torque is transmitted.

Slip couplings having a number of driven members contacting an irregularly shaped drive member are known but are generally noisy, subject to considerable wear, and require close alignment of the driving and driven elements.

The present invention has as one of its objects, the provision of a simple, quiet coupling means which will transmit only a safe limited torque.

Another object is the provision of such a coupling which will generate noise when overloaded to indicate to an operator that attention is required.

A further object of the invention is the provision of a drive coupling which does not require close alignment between the driving and driven parts permitting easier and cheaper assembly into a machine.

With these and other similar objects in view, the invention consists in certain novel features of construction as set forth in the preferred embodiment of the invention described in the following specification and with reference to the appended drawings.

Figure 1:
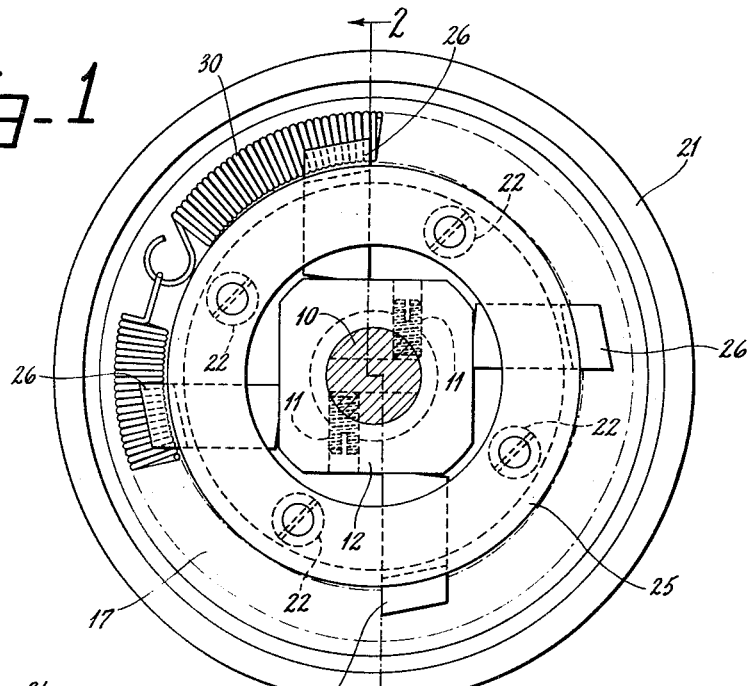
Figure 1 is an elevational view of the slip coupling of the invention.
Figure 2:
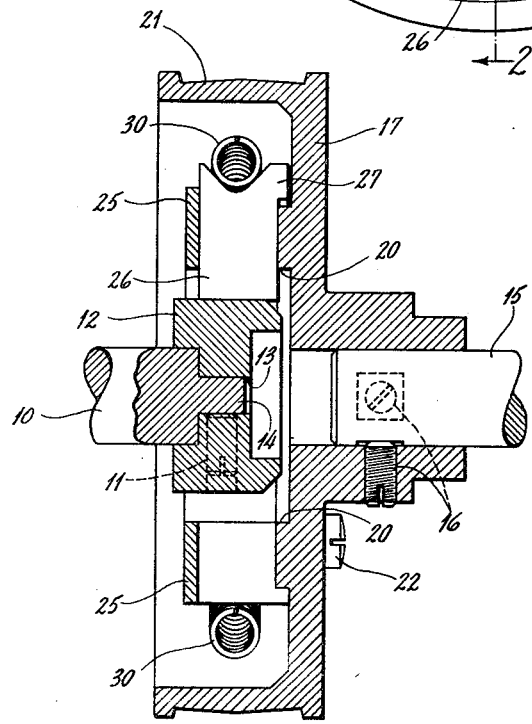
Figure 2 is a sectional view taken along the line 2—2 of Figure 1.

Referring to the drawings, shaft 10, Figure 2, may be the shaft of an electric motor or other driving means. Secured on shaft 10 by means of set screws 11 is a square cam 12 which may have its corners rounded off concentrically with shaft 10 to limit the transmitted torque and the noise generated when the coupling slips. If desired cam 12 may be formed with a slot 13 into which a tongue 14 of drive shaft 10 is inserted.

A driven shaft 15, approximately concentric with shaft 10 and slightly spaced therefrom, has secured thereto by set screws 16, a circular cage 17. Cage 17 is made with a flange 20 having a central recess sufficient in diameter to accommodate square cam 12. Cage 17 is also formed with an external periphery 21 which may be used as a pulley. Fixed to the flange 20 by screws 22 and concentric with cage 17 is an annular member 25 having a plurality, in this case four, slots equidistantly spaced but cut tangent to a concentric circle smaller than square cam 12.

Freely slidable in each slot of member 25 is a driving lug 26, preferably of cast nylon although any suitable material may be used. Each lug 26 is formed with a notched outer end and has an ear 27 to contact flange 20 and limit inward motion of the lug 26. The inner end of each lug 26 is relieved over approximately one half its face, see Figure 3, to enable a gradual camming action by square cam 12 in the event of slippage. A circular helical spring 30 surrounds all lugs 26 and is positioned in their notched ends to urge all lugs 26 inwardly into contact with square cam 12.

Figure 3:
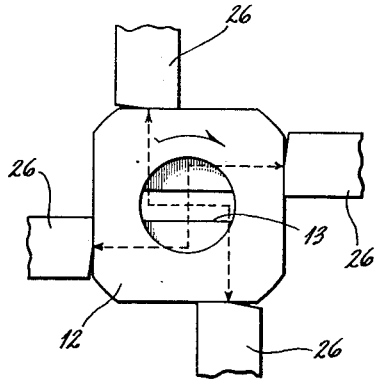
Figure 3 is a detail view showing diagrammatically the manner in which the driving forces are applied on the driven elements.

It has been found that for quiet running of a coupling of this type, the driving lugs 26 must be offset from the center line of the driving cam 12 as indicated in Figure 3. Such position of the lugs provides a driving arm for power transmission and does not rely upon the camming effect of the drive cam on the lugs to transmit torque. Such off center positioning of lugs 26 limits the drive to the one direction of rotation indicated by the arrow, Figure 3. Such limitation is, however, compensated for by the fact that a coupling as described may be set to slip at an overload only slightly greater than the normal driving load thus preventing damage on even delicate parts. The offset lugs 26 are also capable of efficient driving without noise even though the two shafts 10 and 15 are out of alignment or at a slight angle, permitting rapid and inexpensive assembly of the motor to the driven machine and efficient repair service when required.

The above description is of a preferred embodiment only of my invention and many variations in structure are possible without departing from the spirit of the invention as set forth in the following claims.

What is claimed is:

1. A rotary drive coupling to connect a driving and a driven member for rotation in a preferred direction, said coupling comprising a driving cam in the shape of a regular polygon secured to said driving member, a slotted member secured to said driven member and surrounding said cam, the slots in said member being equally spaced, equal in number to the number of sides of said polygon and being directed along lines tangent to a circle concentric with the center of said slotted member and at points trailing with respect to said direction of rotation, driving lugs in said slots and resilient means to urge said driving lugs against said driving cam.

2. A unidirectional rotary drive coupling for mechanisms having aligned driving and driven shafts, said coupling comprising a drive cam mounted on said drive shaft and having equal straight sides, a cage member secured to said driven shaft and surrounding said drive cam, said cage member being formed with a plurality of slots in the plane of said drive cam and each offset from the parallel diameter of said cage by equal distances in a direction opposite to the designed direction of rotation of said drive cam, drive plungers in said slots and resilient means to urge said drive plungers into contact with said drive cam.

3. A drive coupling as specified in claim 2 in which said drive cam is formed with concentric arcs between said straight sides and said drive plungers have their drive cam contacting faces relieved along the portion nearest to an arc of said drive cam.

4. A torque limiting drive coupling for connecting a driving and a driven shaft for rotation in a preferred direction comprising a square drive cam having concentric rounded corners and secured to said driving shaft, a driven cage secured to said driven shaft and surrounding said drive cam, said driven cage formed with four equally spaced slots, each parallel to a diameter of said cage and offset rearwardly therefrom with respect to said direction of rotation, a torque transmission member freely slidable in each slot, a part of the drive cam contacting face of each torque transmission member being relieved at a small angle along the side adjacent the closer corner of said drive cam, and resilient means to urge said torque transmission members into contact with a face of said drive cam.

References Cited in the file of this patent
UNITED STATES PATENTS

| Number | Name | Date |
|---|---|---|
| 1,611,940 | Ohmer | Dec. 28, 1926 |
| 2,370,904 | Kimball | Mar. 6, 1945 |
| 2,501,648 | Ogden | Mar. 21, 1950 |